Feb. 11, 1930.   C. W. DAWSON   1,746,242
FEEDING DEVICE FOR SLICING MACHINES
Filed Nov. 7, 1925   3 Sheets-Sheet 3
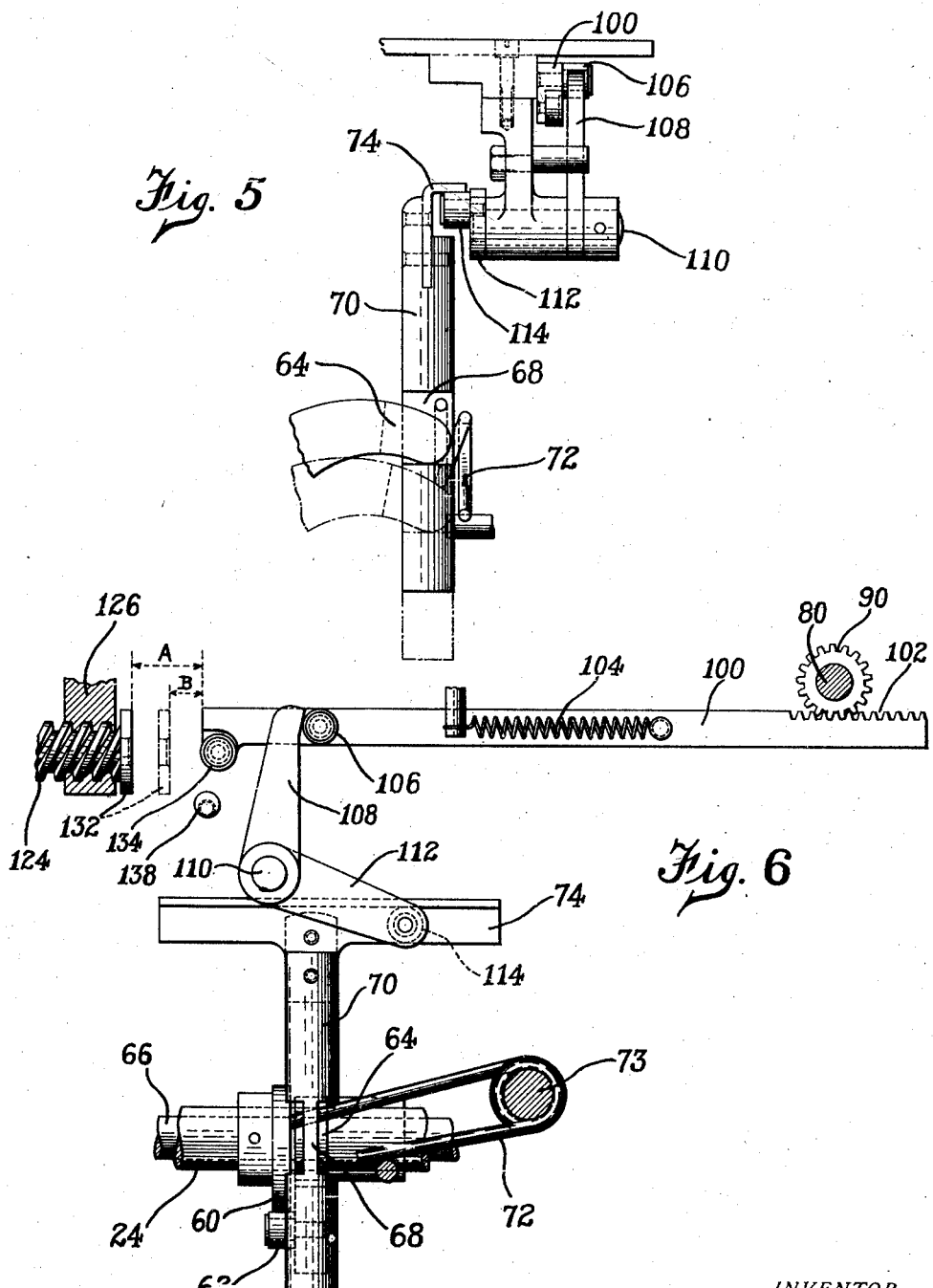

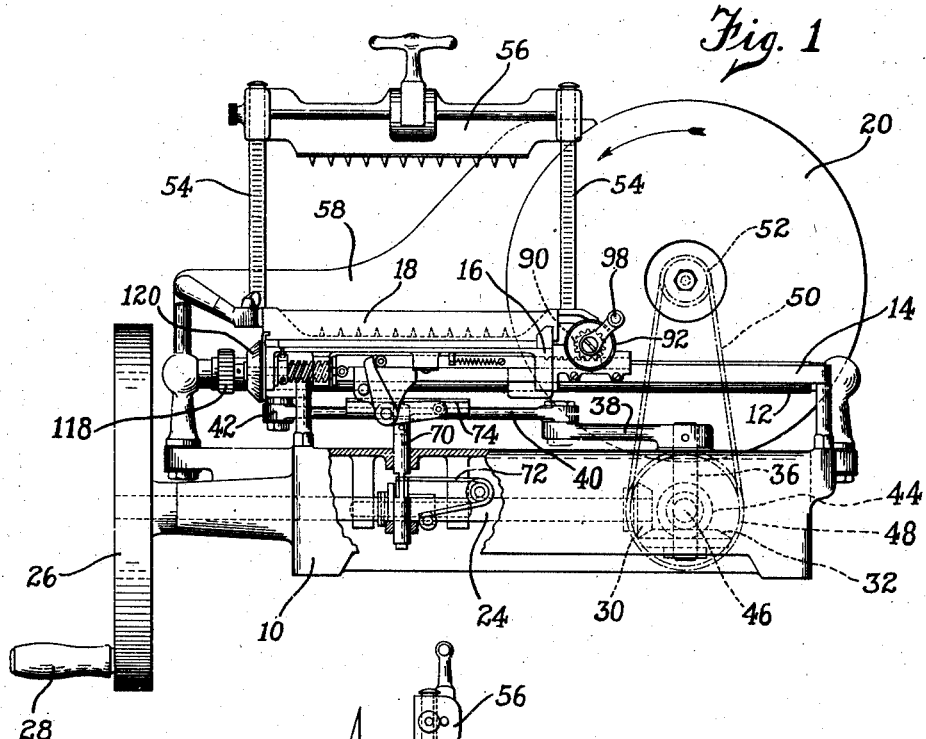

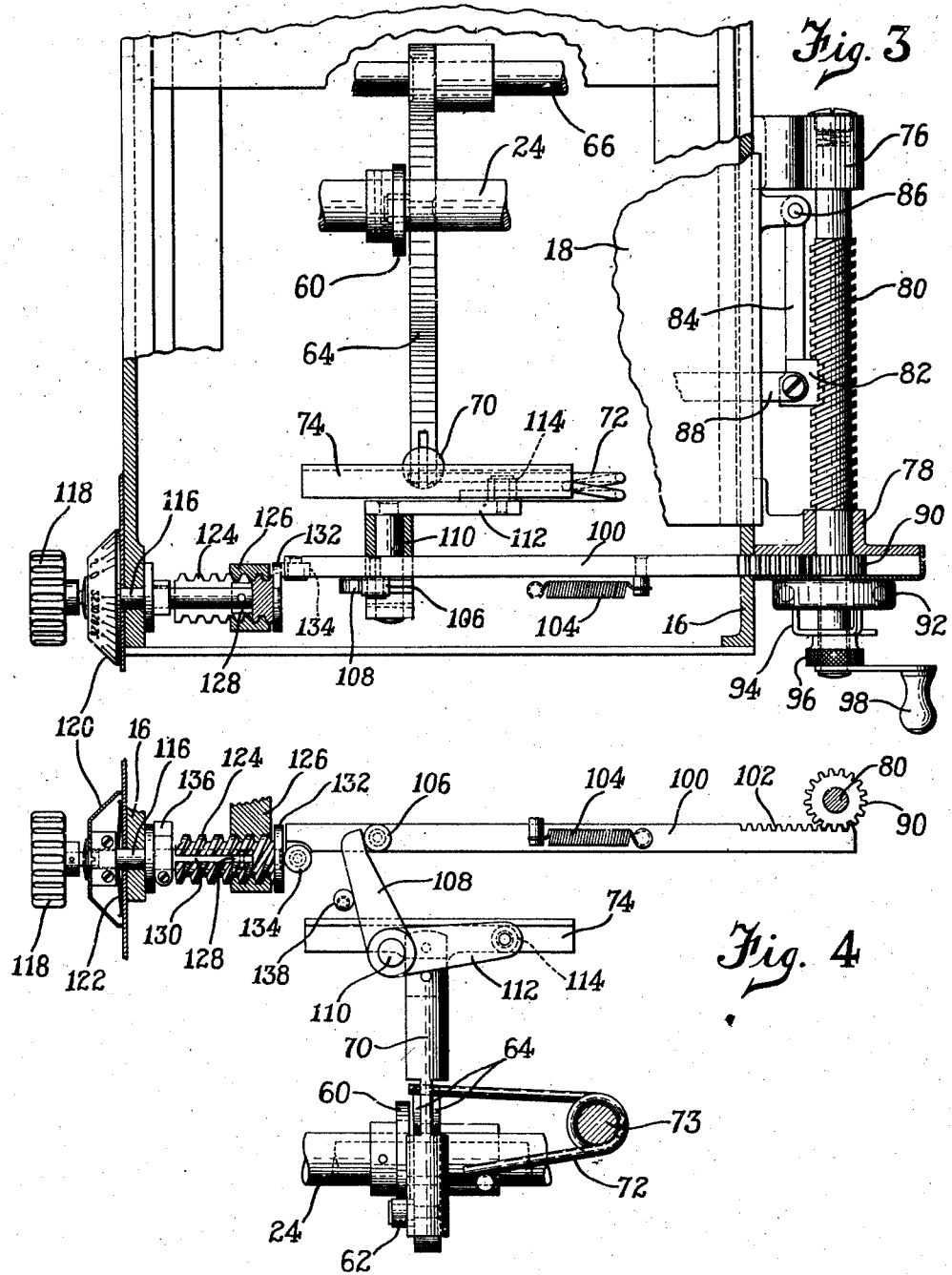

Patented Feb. 11, 1930

1,746,242

UNITED STATES PATENT OFFICE

CHARLES W. DAWSON, OF DAYTON, OHIO, ASSIGNOR TO DAYTON SCALE COMPANY, OF DAYTON, OHIO, A CORPORATION OF NEW JERSEY

FEEDING DEVICE FOR SLICING MACHINES

Application filed November 7, 1925. Serial No. 67,560.

This invention pertains to meat slicers of the type comprising a reciprocating table on which is mounted a meat plate to which the meat to be cut is secured. As the table is reciprocated past a rotating knife the meat plate is fed towards the knife by equal predetermined increments with the result that slices of equal thickness are cut from the meat, one slice being cut during each forward passage of the meat past the knife.

One of the problems in machines of this kind is to provide suitable devices for feeding the meat plate towards the knife and it is the particular object of this invention to supply feeding mechanism which is simple in design, cheap to manufacture, easy to set for desired thicknesses of slice, positive in its adjustments, silent in operation, and which, when set for any particular thickness of slice will cut that thickness without noticeable variation.

In the drawings,

Fig. 1 is the front view of a meat slicer of above description.

Fig. 2 is a view of the same machine from the fly-wheel end with part of the fly-wheel, frame and table broken away.

Fig. 3 is a plan view showing the assembly of the parts of my feeding mechanism.

Fig. 4 is a front view of most of the parts in Fig. 3 except the clutch and screw.

Fig. 5 is an end view of a portion of my feed mechanism.

Fig. 6 is an enlarged view similar to Fig. 4 but with the parts in different position.

In its main features the meat slicer comprises the frame 10 on which are mounted the round rail 12 and rectangular rail 14. Slidably mounted on these rails is the table 16 on which in turn is carried the meat plate 18 mounted on ways to slide at right angles to rails 12 and 14. The circular knife 20 is mounted for rotation in a pedestal 22 fast to main frame 10.

The drive shaft 24 of the machine is carried in bearings in frame 10. The outer end of the shaft bears a fly-wheel 26 which is provided with an operating handle 28. The inner end of shaft 24 is provided with a bevel pinion 30 in mesh with horizontal gear 32. Horizontal gear 32 is fast on vertical shaft 36 which has secured on its upper end a crank arm 38 connected by link 40 to the sliding table at 42. In mesh with gear 32 is a beveled pinion 44 fast on shaft 46, which through sprocket 48, chain 50 and sprocket 52, drives knife 20.

Meat plate 18 is provided with two vertical posts 54 on which is mounted the meat clamp 56. 57 and 58 are guard plates adjacent the knife for the protection of the operator, and horizontal plate 59 serves to receive the slices as they fall from the knife.

As shaft 24 is rotated by the operator the knife is turned as indicated by the arrow, table 16 is reciprocated on rails 12 and 14 by crank 38 through link 40 in a manner well known to those familiar with the art. At the beginning of each stroke of table 16 the meat plate 18, with the meat clamped to it by clamp 56, is fed a predetermined increment towards the knife by the mechanism which forms the subject matter of the present invention and which will now be described.

Mounted near the middle of shaft 24 is a cam 60 (Figs. 2, 3 and 6). Bearing against the under side of cam 60 is the roller 62 mounted on substantially horizontal lever 64, one end of which is pivotally mounted on pin 66, fast in frame 10, and the other bifurcated end of which engages the narrow portion 68 of vertical member 70. Roller 62 is kept in resilient contact with cam 60, and vertical member 70 is constantly pressed upwards by spring 72 mounted on stud 73 in frame 10.

Fast on the upper end of member 70 is the horizontal angle piece 74. From the above construction it is evident that cam 60 will depress angle piece 74 once every revolution of shaft 24. Bevel pinion 30 has half as many teeth as gear 32, so cam 60 will make two revolutions for every revolution of crank 38 and angle 74 will be depressed twice for every revolution of shaft 36. Cam 60 is so located and so shaped that one depression of angle 74 occurs at each end of the slicing stroke of the table. The depression at the right hand end of the stroke (Fig. 1) is idle as will be explained later and we are not concerned with it. The depression at the left hand end of the stroke is utilized to actuate the meat plate, and is timed to occur entirely in the interval of time while table 16 is completing its stroke to the left and beginning its stroke to the right during which time the meat is entirely to the left of the knife and out of contact with it.

Projecting from the right side of table 16 (Fig. 3) are bearings 76 and 78 in which is mounted for rotation the worm 80. Adjacent worm 80 is the half nut 82 on arm 84 which is pivoted at 86 to meat plate 18. Nut 82 may be engaged or disengaged with worm 80 at the will of the operator by means of rod 88 which extends to a handle not shown on the other side of the table. With nut 82 engaged rotation of worm 80 will move meat plate 18.

Mounted on the forwardly extending shaft of worm 80, in front of bearing 78, are pinion 90, ball ratchet 92, ratchet disabling fingers 94 attached to knob 96, and crank handle 98. Pinion 90 is free on the shaft but attached to ratchet 92 in such manner that pinion 90 is free to rotate in one direction but is restrained from rotation in the other direction so long as fingers 94 are in retracted position. Whenever fingers 94 are pushed forward by knob 96 the fingers move the balls of the ratchet to such position that the ratchet is inoperative and while pinion 90 stands still worm 80 may be turned in either direction by hand crank 98. This construction is described in detail in the U. S. patent to Wood No. 1,594,399, issued August 3, 1926. Extending at right angles to worm 80 and slidably supported in table 16 is bar 100 which has on a portion of its upper surface rack teeth 102 engaging the under side of pinion 90. When not otherwise restrained, bar 100 is drawn to the left by spring 104, one end of which is fast to the table and the other end to bar 100.

Mounted on one side of bar 100 is a roller 106 engaging one edge of the vertical arm 108 pivotally mounted on the table at 110. The horizontal arm 112 of the bell crank carries a roller 114 so located as to be engaged by the under side of angle member 74. Mounted on the left side of the meat table in substantially axial alignment with bar 100 is a shaft 116 having on its outer end a knob 118 and a graduated dial 120. Enclosed within dial 120 and bearing against table 16 is a friction disc 122 which serves to retain shaft 116 and dial 120 in position in which the operator sets them. Mounted on shaft 116 is a worm 124 threaded into the nut 126 fast to table 16. The inner end of shaft 116 is provided with a cross piece 128 which extends into slot 130 cut through worm 124 for most of its length. This construction permits worm 124, when turned by shaft 116 through the instrumentality of cross piece 128, to move back and forth through nut 126 without moving knob 118 or dial 120 endwise. The extreme inner end of worm 124 bears a disc or flange 132 which serves as a stop for roller 134 on the left end of bar 100, as will later appear. Block 136 fast on shaft 116 serves as a stop to limit the rotation of shaft 116, and eccentric stud 138 acts as a stop for bell crank arm 108.

In the operation of the machine with bar 100 drawn to the left against flange stop 132, arm 112 will be in elevated position as in Fig. 4, which shows the position of the parts with table 16 near the left end of its stroke at the instant member 70 is starting downward under the influence of cam 60, as already described. As the table neared the end of its travel to the left, roller 114 on arm 112 passed under angle piece 74, so when angle 74 is drawn down by member 70, roller 114 will be drawn down with it, arm 112 will be rocked about pivot 110 and vertical arm 108 bearing against roller 106 will force bar 100 to the right, rotating pinion 90, ratchet 92, and worm 80, thereby advancing meat table 18 an increment towards knife 20. The positions of the parts at the end of the downward stroke of 70 are shown in Fig. 6, and it is evident that in moving from the positions in Fig. 4 to those in Fig. 6 bar 100 has been moved to the right the distance indicated at "A" in Fig. 6, and the feed worm 80 turned a proportionate amount.

The depression of member 70 when the meat table is at the right hand end of its stroke, as shown in Fig. 1, is idle, as the levers 108 and 112, being attached to the table move with it to the right and the roller 114 is removed from the path of travel of the angle 74.

It will also be evident that if stop flange 132 had been in the dotted position shown in Fig. 6, the distance bar 100 would have been moved is represented by "B" and the meat plate 18 would have been fed a proportionally decreased increment. With such a setting the first part of the movement of arm 108 is idle as arm 108 does not contact with roller 106 until the latter portion of its stroke.

Knob 118, graduated dial 120 and worm 124 furnish the operator a ready means of setting stop 134 and thereby adjusting the length of stroke of bar 100 and the interrelated amount of feed of meat plate 18. This means that my invention provides devices by which the operator may readily obtain any desired thickness of slice within the limits provided by the mechanism by simply setting dial 120 to the graduation indicating the desired thickness, and it will be evident to those skilled in the art that the mechanism is simple, positive, cheap to manufacture and that it will be substantially silent in operation

What I claim is—

1. In a slicing machine including a knife, an article supporting plate, and feeding means including a main shaft for moving said plate in equal predetermined increments transversely of said knife; a cam element actuated by the main shaft, a rack member for moving said plate, means intermediate said cam element and rack member adapted to actuate said rack member under the control of said cam element, and means to move said intermediate means into engaging position when said plate is out of slicing position and into disengaging position when said plate is in slicing position.

2. A machine as described in claim 1, wherein said cam element is fixed directly upon the driving shaft.

3. A machine as described in claim 1 wherein said intermediate means comprises a bell crank lever actuating said rack member and a movable actuating bar under the control of said cam element for actuating with said bell crank lever.

4. In a machine of the class described, in combination, a main shaft, a reciprocable table, a plate mounted for transverse movement on said table, and means to move said plate in equal predetermined increments relatively to said table; said means including a rack member, a cam on said main shaft, and means to actuate said rack member through said cam, said means being effective under the control of said reciprocating table.

5. In a machine of the class described, in combination, a drive shaft, a reciprocable table, a plate mounted for transverse movement on said table, means for moving said table in equal predetermined increments relatively to said table; said means including a rack member, a cam on said drive shaft, and means under the control of said table to actuate said rack member through said cam in one position of said table and to prevent coaction of said rack member and cam in another position of said table.

6. In a machine of the class described, in combination, a drive shaft, a reciprocable table, a plate mounted for transverse movement on said table, and means to move said plate in equal predetermined increments relatively to said table, said means including a rack member, a depressible member, and a cam on said drive shaft, said cam actuating said rack member through the instrumentality of said depressible member, and means to couple said rack member and depressible member for coaction only during a predetermined portion of the movement of said reciprocating table.

7. In a machine of the class described, in combination, a drive shaft, a reciprocable table, a plate mounted for transverse movement on said table, and means to move said plate in equal predetermined increments relatively to said table, said means including a cam on said drive shaft, a depressible member controlled by said cam, and a lever attached to said table and coacting with said depressible member only in predetermined positions of said table, a feed worm and rack for actuating said feed worm, said rack being actuated by said lever to transmit motion from said depressible member to said feed worm.

8. In a slicing machine in combination, a drive shaft, a reciprocable table, a plate mounted for transverse movement on said table, a feed screw mounted for rotation on said table and engaging said plate, means including a ratchet for periodically rotating said feed screw in equal predetermined increments, a rack for operating said ratchet, said rack being adapted to be actuated from a cam on said drive shaft and means associated with said table to couple said cam and said ratchet for coaction only in predetermined portions of the movement of said plate.

9. The invention set forth in claim 8, including a depressible member associated with the machine frame and a lever pivotally attached to said table operated by said depressible member, said cam actuating said rack through the instrumentality of said member and said lever.

In testimony whereof I hereto affix my signature.

CHARLES W. DAWSON.